United States Patent
Lee et al.

(10) Patent No.: US 8,310,747 B2
(45) Date of Patent: Nov. 13, 2012

(54) ELECTRONIC PAPER DISPLAY DEVICE AND METHOD OF MANUFACTURING THE SAME

(75) Inventors: Sang Moon Lee, Seoul (KR); Jong Su Yi, Yongin (KR); Young Woo Lee, Suwon (KR); Hwan-Soo Lee, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 71 days.

(21) Appl. No.: 12/879,354

(22) Filed: Sep. 10, 2010

(65) Prior Publication Data

US 2011/0127898 A1    Jun. 2, 2011

(30) Foreign Application Priority Data

Dec. 1, 2009  (KR) .......................... 10-2009-0117645

(51) Int. Cl.
*G02B 26/00*  (2006.01)
(52) U.S. Cl. .......................... 359/296; 359/245; 359/291
(58) Field of Classification Search .................... 359/296
See application file for complete search history.

(56) References Cited

U.S. PATENT DOCUMENTS

| 6,017,584 A | 1/2000 | Albert et al. |
| 6,222,513 B1 * | 4/2001 | Howard et al. ................. 345/84 |
| 7,167,155 B1 | 1/2007 | Albert et al. |

FOREIGN PATENT DOCUMENTS

| JP | 2005-156809 | 6/2005 |
| JP | 2007-240757 | 9/2007 |
| JP | 2008-268772 | 11/2008 |
| KR | 2003-0038789 | 5/2003 |
| WO | WO 02/29485 | 4/2002 |

* cited by examiner

*Primary Examiner* — James Jones
(74) *Attorney, Agent, or Firm* — McDermott Will & Emery LLP

(57) ABSTRACT

There is provided an electronic paper display device, and a method of manufacturing the same. The electronic paper display device includes a display side electrode formed of a transparent material, a rear electrode opposing the display side electrode, a substrate disposed between the display side electrode and the rear electrode, and including a plurality of partition walls separating a space between the display side electrode and the rear electrode and a plurality of cell spaces formed by the plurality of partition walls, and two or more types of rotary bodies disposed in the plurality of cell spaces and displaying different respective colors. The same type of rotary bodies displaying the same color among the rotary bodies includes a plurality of rotary bodies having different respective shades. The electronic paper display device has high image stability and uniformity and enables the expression of various shades.

8 Claims, 5 Drawing Sheets

ELECTRONIC PAPER DISPLAY DEVICE AND METHOD OF MANUFACTURING THE SAME

CROSS-REFERENCE TO RELATED APPLICATIONS

This application claims the priority of Korean Patent Application No. 10-2009-0117645 filed on Dec. 1, 2009, in the Korean Intellectual Property Office, the disclosure of which is incorporated herein by reference.

BACKGROUND OF THE INVENTION

1. Field of the Invention

The present invention relates to an electronic paper display device and a method of manufacturing the same, and more particularly, to an electronic paper display device, capable of having high image stability and uniformity and expressing various shades, and a method of manufacturing the same.

2. Description of the Related Art

A shift in information exchange and sharing methods is currently in demand, corresponding to modern society's requirement for a new information delivery paradigm. To meet this demand, the development of technologies associated with flexible electronic paper has recently been accelerated and are now entering the phase of commercial development.

Compared with existing flat display panels, an electronic paper display requires relatively low manufacturing costs, and is far superior in terms of energy efficiency since it is operable even with a very low level of energy due to the needlessness of backlighting or continuous recharge. Furthermore, electronic paper enables a high definition display, provides a wide viewing angle, and is equipped with a memory function that retains the display of letters (characters) even when unpowered. The above-described advantages make electronic paper applicable in a wide variety of technical fields, such as electronic books having paper-like sheets and moving illustrations, self-updating newspapers, reusable paper displays for mobile phones, disposable TV screens, and electronic wallpaper. There is a massive potential market for such electronic paper.

A technical approach for the implementation of electronic paper may be roughly divided into four methods: a twist-ball method, an electrophoretic method, a quick response-liquid power display (QR-LPD) method, and a cholesteric liquid crystal display method. Here, the twist ball method involves rotating spherical particles, each having upper and lower hemispheres having opposite electrical charges and different colors, by using an electric field. As for the electrophoretic method, colored charged particles mixed with oil are trapped in micro-capsules or micro-cups, or charged particles are made to respond to the application of an electric field. The QR-LPD method uses charged powder. The cholesteric liquid crystal display method uses the selective reflection of cholesteric liquid crystal molecules.

As for the twist-ball method, cells are filled with a transparent medium, and twist balls, each having opposite electrical charges and colored with different colors, for example black and white, are disposed in the transparent medium. Each twist ball, when receiving voltage, rotates such that the part of its body having an opposite polarity to the received electric charge faces the front. In such a manner, black and white are displayed.

However, the above-described structure displays only two states of black and white all of the time, and thus has limitations in expressing a variety of shades (i.e., tones).

SUMMARY OF THE INVENTION

An aspect of the present invention provides an electronic paper display device capable of having high image stability and uniformity and expressing a variety of shades, and a method of manufacturing the same.

According to an aspect of the present invention, there is provided an electronic paper display device including: a display side electrode formed of a transparent material; a rear electrode opposing the display side electrode; a substrate disposed between the display side electrode and the rear electrode, and including a plurality of partition walls separating a space between the display side electrode and the rear electrode, and a plurality of cell spaces formed by the plurality of partition walls; and two or more types of rotary bodies disposed in the plurality of cell spaces and displaying different respective colors, wherein the same type of rotary bodies, which display the same color, among the rotary bodies include a plurality of rotary bodies having different respective shades.

The rotary bodies may include three types of rotary bodies respectively displaying red, green and blue.

The rotary bodies may each have a first display region colored white or black and a second display region colored red, green or blue, the first and second display regions having different electrical charge properties.

The same type of rotary bodies may include three rotary bodies having a relative shade ratio of 4:2:1.

The rotary bodies may each have a spherical, oval or cylindrical shape.

According to another aspect of the present invention, there is provided a method of manufacturing an electronic paper display device, including: preparing a substrate including a plurality of partition walls and a plurality of cell spaces formed by the plurality of partition walls; disposing two or more types of rotary bodies displaying different respective colors in the plurality of cell spaces, wherein the same type of rotary bodies, which display the same color, among the rotary bodies include a plurality of rotary bodies having different respective shades; forming a display side electrode on the substrate to cover the rotary bodies; and forming a rear electrode on the substrate such that the rear electrode opposes the display side electrode.

The substrate may be formed by an imprinting process, a laser patterning process, a photolithography process or an etching process.

The disposing of the two or more types of rotary bodies may include: disposing a mask or a filter, exposing the cell spaces, on the substrate; and injecting the rotary bodies by using a squeegee.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
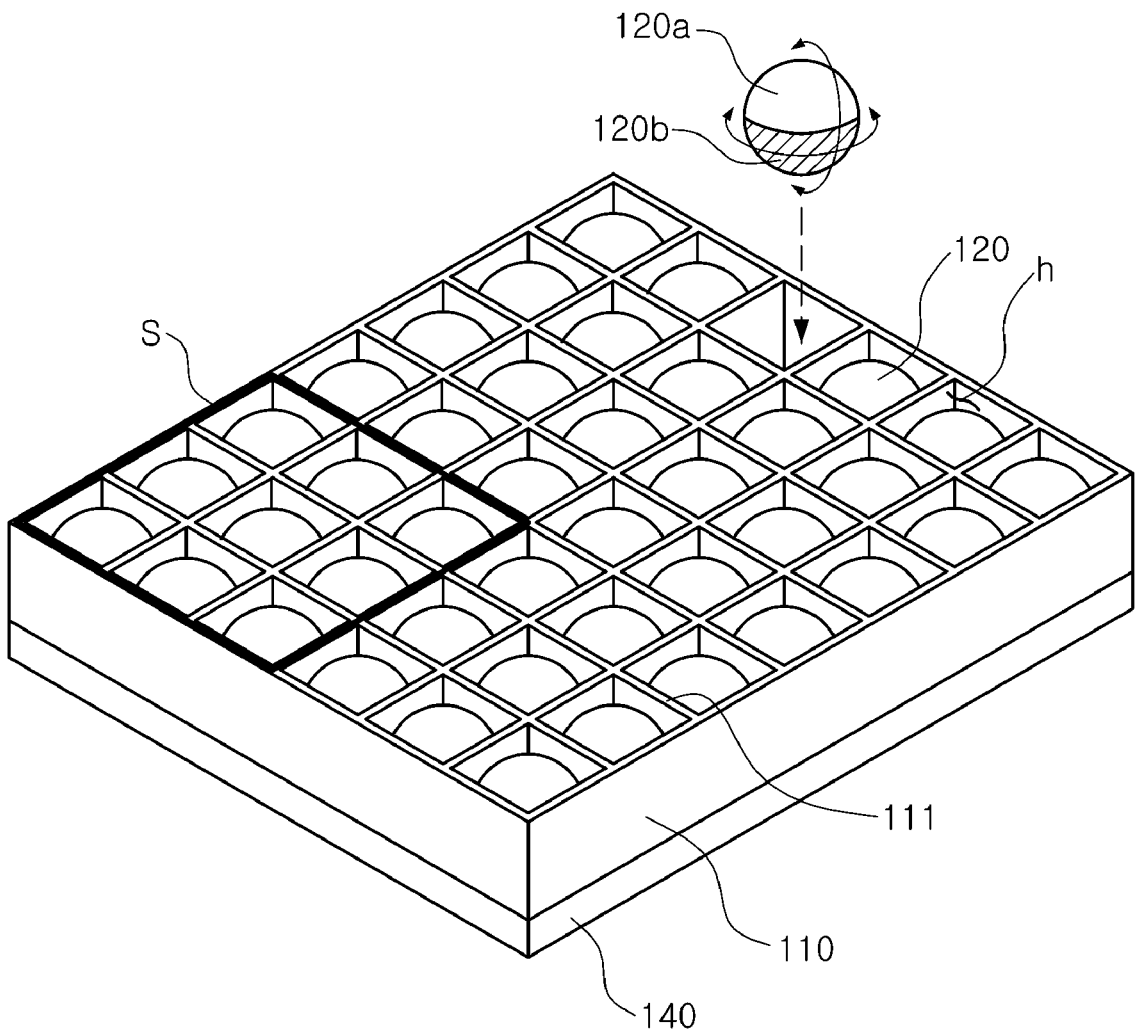
FIG. 1 is a schematic perspective view illustrating an electronic paper display device according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity. The same or equivalent elements are referred to with the same reference numerals throughout the specification.

Figure 2:
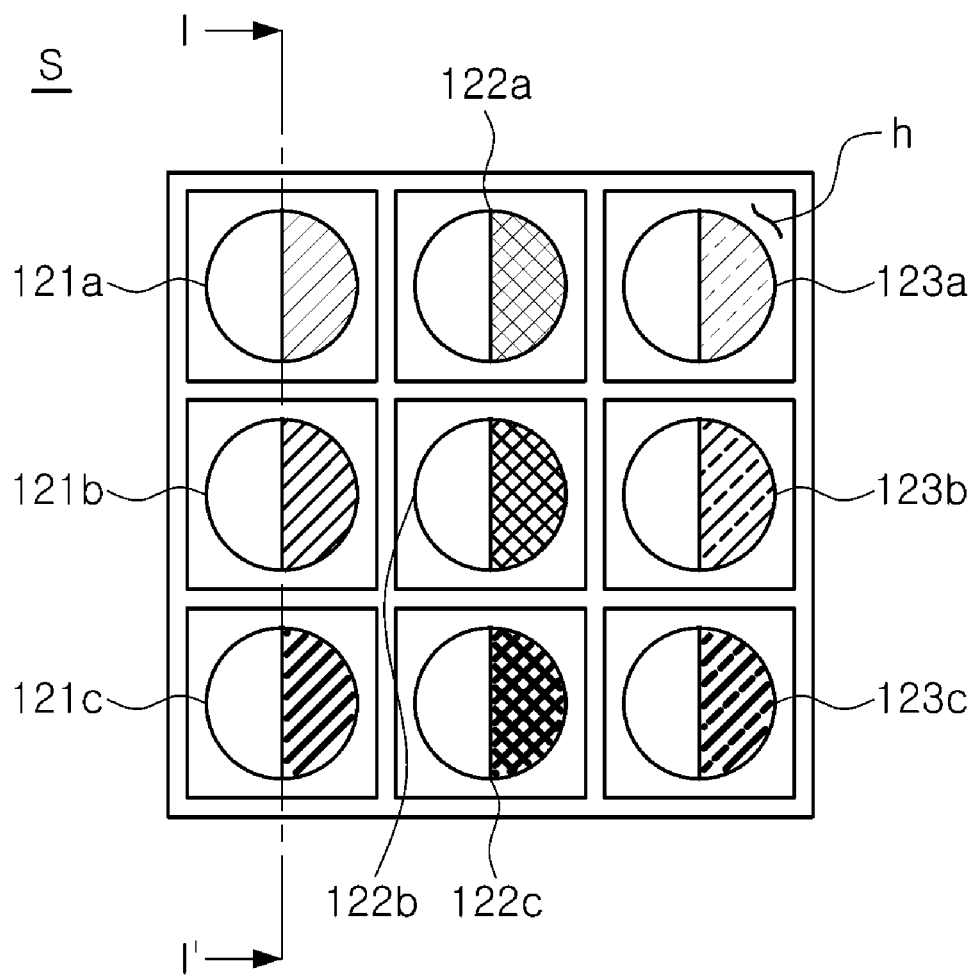
FIG. 2 is a top plan view schematically illustrating region S indicated in FIG. 1.

FIG. 1 is a schematic perspective view illustrating an electronic paper display device according to an exemplary embodiment of the present invention. FIG. 2 is a top plan view schematically illustrating region S indicated in FIG. 1.

Referring to FIGS. 1 and 2, an electronic paper display device, according to this exemplary embodiment, includes a display side electrode (not shown) formed of a transparent material and disposed at a display side; a rear electrode 140 opposing the display side electrode, and a substrate 110 disposed between the display side electrode and the rear electrode 140. In FIGS. 1 and 2, the display side electrode is not shown for the purpose of illustrating rotary bodies disposed in the cell spaces of the substrate 110.

The substrate 110 includes a plurality of partition walls 111 separating a space between the display side electrode and the rear electrode 140, and a plurality of cell spaces h formed by the plurality of partition walls 111. A plurality of rotary bodies 120 are disposed in the plurality of cell spaces h.

The display side electrode (not shown) and the rear electrode 140 may be formed by using an electrode material that is typically used in the art of the present invention. For example, the electrode material may utilize a conductive polymer such as polythiophene or polyaniline, metallic particles such as silver or nickel, a polymer film containing the metallic particles, indium tin oxide ITO or the like.

Further, the rear electrode 140 may be formed as an electric field application part or a matrix address electrode that enables the independent driving of the rotary bodies 120. In addition, a thin film transistor (TFT), allowing the rotary bodies respectively disposed in the cell spaces to be independently driven, may be formed on the rear electrode 140.

The substrate 110 may be formed of a flexible resin, and may utilize, for example, polyethylene terephthalate (PET), polycarbonate (PC), poly(methyl methacrylate) (PMMA), polyethylene naphthalate (PEN), polyethersulfone (PES), cyclic olefin copolymer (COC), polydimethylsiloxane (PDMS), and polyurethane acrylate (PUA), and a mixture of thereof. The substrate 110 is not limited to the above described materials, however.

The substrate 110 includes the plurality of partition walls 111 separating the space between the display side electrode and the rear electrode 140, and the plurality of cell spaces h formed by the partition walls 111. In this exemplary embodiment, the spaces between the partition walls are defined as cell spaces.

The rotary bodies 120 are disposed in the plurality of cell spaces h, respectively. Further, the cell spaces h may be filled with a dielectric liquid in order to facilitate the rotation of the rotary bodies 120.

Referring to FIG. 1, the rotary bodies 120 each have two display regions 120a and 120b colored with different colors and having different electrical charge properties.

The first display region 120a of the two display regions 120a and 120b is colored black or white, while the second display region 120b is colored red, green or blue. When the first display region 120a is positively charged, the second display region 120b is negatively charged.

When voltage is applied to the rotary body 120 by the display side electrode and the rear electrode 140, the rotary body 120 is rotated according to the magnitude and direction of the applied voltage, thereby displaying a color depending on the colors of the two display regions.

The electronic paper display device, according to this exemplary embodiment of the present invention, includes two or more types of rotary bodies that display different colors, respectively. The same type of rotary bodies refer to rotary bodies that respectively have second display regions 120b colored with the same color and display the same color among red, green and blue besides white (or black).

According to this exemplary embodiment, three types of rotary bodies 121, 122 and 123 are illustrated. The first type of rotary bodies 121 display red for example, and include three rotary bodies 121a, 121b and 121c that have different respective shades. Here, the three rotary bodies 121a, 121b and 121c having different respective shades are disposed in adjacent cell spaces, and the arrangement thereof is not limited specifically.

The relative shade ratio of these three rotary bodies 121a, 121b and 121c may be 4:2:1. In this case, the first rotary body 121a of the first type of rotary bodies 121a, 121b and 121c may display red having a shade of approximately 1, the second rotary body 121b thereof may display red having a shade of approximately 2, and the third rotary body 121c thereof may display red having a shade of approximately 4.

In addition, the second type rotary bodies 122 display, for example, green, and include three rotary bodies 122a, 122b and 122c that have different respective shades. The relative shade ratio of these three rotary bodies 122a, 122b and 122c may be 4:2:1. The first rotary body 122a of the second type of rotary bodies 122a, 122b and 122c may display green having a shade of approximately 1, the second rotary body 122b thereof may display green having a shade of approximately 2, and the third rotary body 122c thereof may display green having a shade of approximately 4.

The third type of rotary bodies 123 display, for example blue, and include three rotary bodies 123a, 123b and 123c that have different respective shades. The relative shade ratio of these three rotary bodies 123a, 123b and 123c may be 4:2:1. The first rotary body 123a of the third type of rotary bodies 123a, 123b and 123c may display blue having a shade of approximately, 1, the second rotary body 123b thereof may display blue having a shade of approximately 2, and the third rotary body 123c thereof may display blue having a shade of approximately 4.

Hereinafter, a method of driving an electronic paper display device according to this exemplary embodiment of the present invention will be described in more detail with reference to FIGS. 3A through 3D.

FIGS. 3A through 3D are schematic cross-sectional views illustrating only the first type of rotary bodies 121a, 121b and 121c depicted in FIG. 2. This may be applied to the second and third type of rotary bodies in the same manner.

Figure 3A:
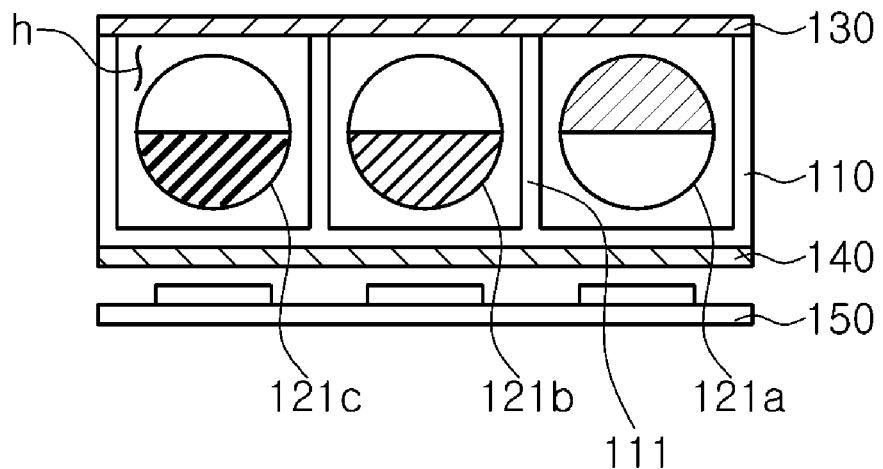
FIGS. 3A through 3D are schematic cross-sectional views illustrating a method of driving an electronic paper display device according to an exemplary embodiment of the present invention.

First, when all of the first type of rotary bodies 121a, 121b and 121c are not rotated, black or white is displayed. Thereafter, as shown in FIG. 3A, when voltage is applied to only the first rotary body 121a of the first type, the first rotary body 121a of the first type is rotated to thereby display red having a shade of approximately 1.

Figure 3B:
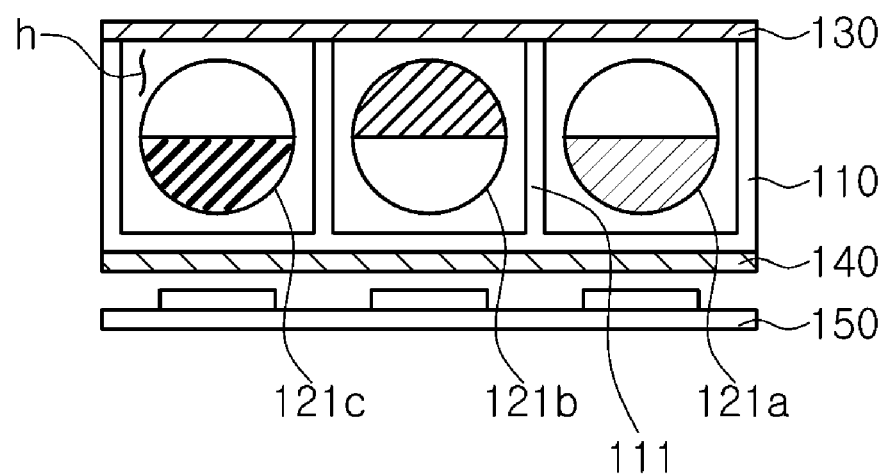

As shown in FIG. 3B, when voltage is applied to only the second rotary body 121b of the first type, the second rotary body 121b of the first type is rotated to thereby display red having a shade of approximately 2.

Figure 3C:
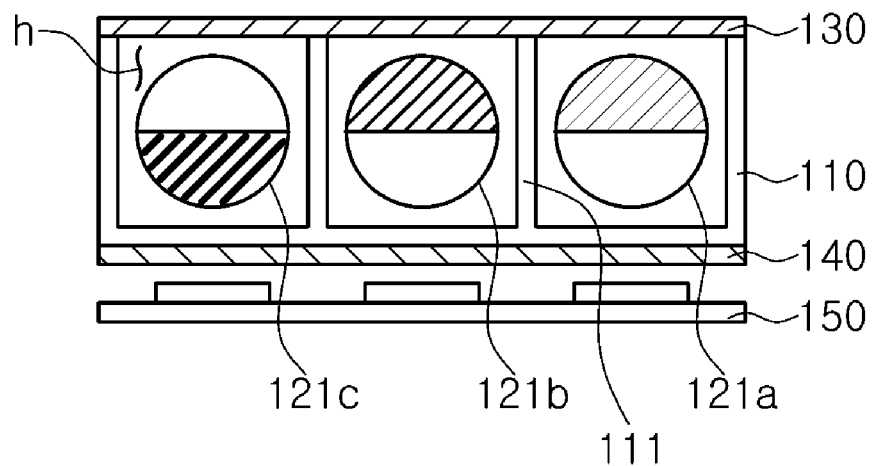

As shown in FIG. 3C, when voltage is applied to the first and second rotary bodies 121a and 121b of the first type, the first and second rotary bodies 121a and 121b of the first type are rotated to thereby display red having a shade of approximately 3.

Figure 3D:
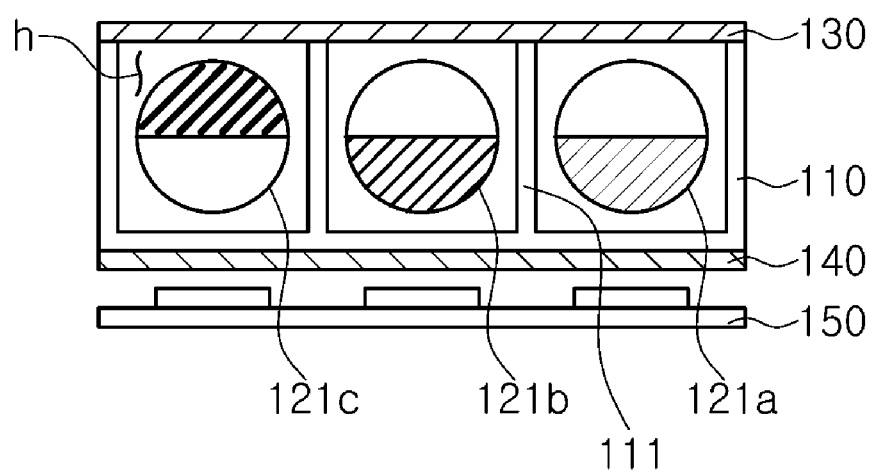

As shown in FIG. 3D, when voltage is applied to only the third rotary body 121c of the first type, the third rotary body 121c of the first type is rotated to thereby display red having a shade of approximately 4.

In order to display red having a shade of approximately 5, voltage is applied to the first and third rotary bodies 121a and 121c of the first type, thereby rotating the first and third rotary bodies 121a and 121c of the first type.

In such a manner, red having a shade of approximately 6, and red having a shade of approximately 7 may be displayed.

Thus, a variety of shades can be expressed by the use of the same type of rotary bodies that have different respective shades.

According to this exemplary embodiment, one color may have eight shades. In addition, a greater number of variations in shades can be expressed according to the number of rotary bodies having different shades.

According to this exemplary embodiment, three types of rotary bodies 121, 122 and 123 display red, green and blue, respectively, and three rotary bodies of each type display the same color with different shades. Consequently, these rotary bodies are disposed in nine cell spaces, respectively, and may constitute a single pixel.

In this case, rotary bodies of the same type, which display the same color, may implement eight different shades. Accordingly, an electronic paper display device including these three types of rotary bodies may express 512 different shades in a single pixel.

A method known in the art may be used as the method of forming the first and second display regions 120a and 120b by electrically and optically treating the rotary body 120. For example, a method of putting a rotary body into a revolving disk provided with two coloring solutions and applying centrifugal force to the rotary body may be used.

The shape of the rotary bodies is not limited specifically, and may be a spherical, oval or cylindrical shape for example.

Hereinafter, a method of manufacturing the electronic paper display device according to an exemplary embodiment of the present invention will be described.

Figure 4A:
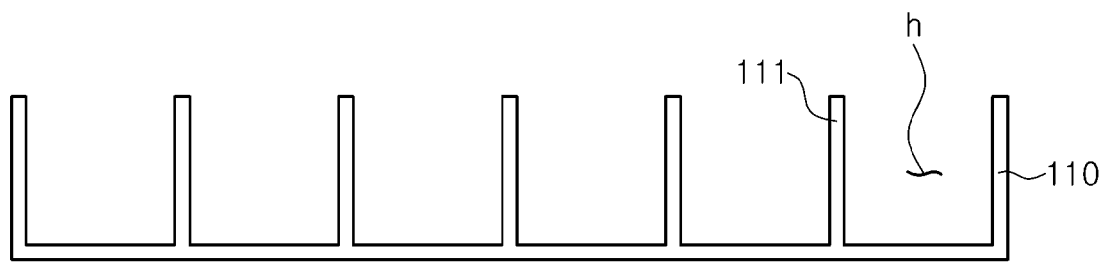
FIGS. 4A through 4C are cross-sectional views illustrating each process of a method of manufacturing an electronic paper display device according to an exemplary embodiment of the present invention.
Figure 4B:
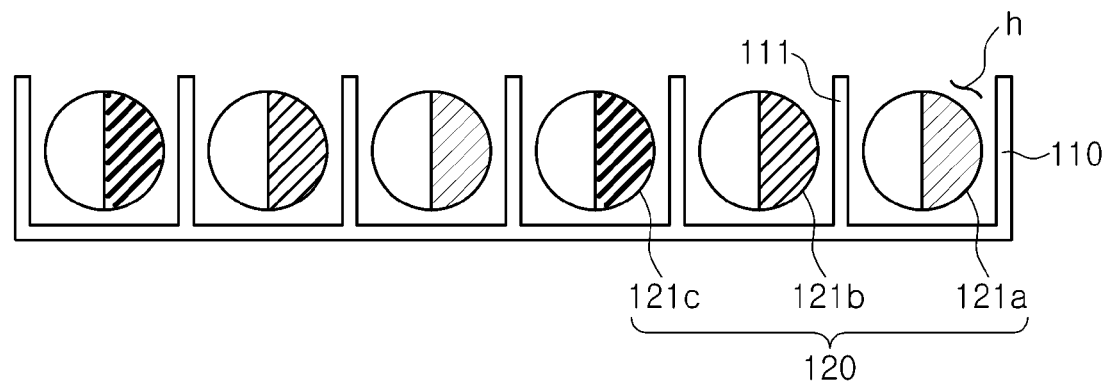
Figure 4C:
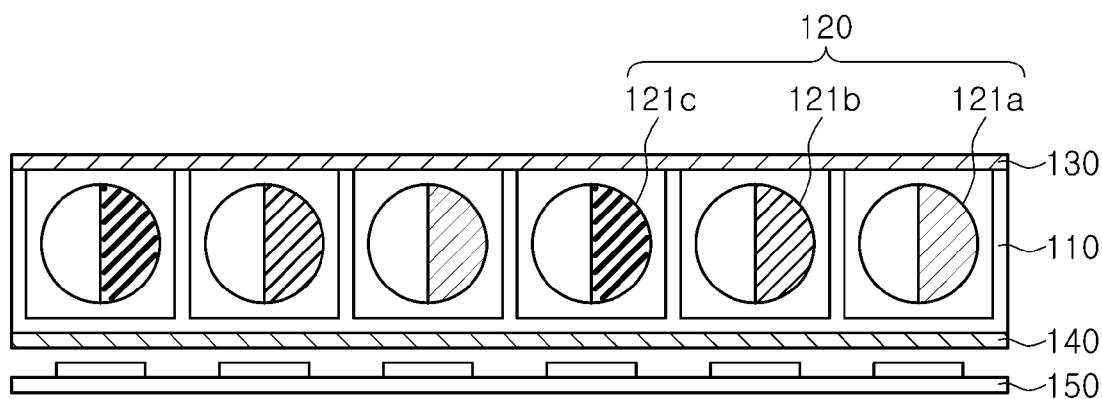

FIGS. 4A through 4C are cross-sectional views illustrating the process of manufacturing the electronic paper display device according to an exemplary embodiment of the present invention.

First, as shown in FIG. 4A, a substrate 110 is prepared. Here, the substrate 110 includes a plurality of partition walls 111 and a plurality of cell spaces h formed by the plurality of partition walls 111.

The substrate 110 may be formed by forming a structure with a predetermined thickness by using a flexible resin, and subjecting the structure to an imprinting method, a laser patterning method, a photolithography method, an etching method or the like.

In the case that the imprinting method is used, a stamp having raised and depressed patterns is pressed into the resin layer of the structure formed of a flexible resin and having a predetermined thickness, thereby forming the substrate 110 having the partition walls 111 and the cell spaces h corresponding to the raised and depressed patterns of the stamp. In this case, the intervals between the partition walls 111 and the shape and sizes of the cell spaces h may be controlled by adjusting the raised and depressed patterns of the stamp.

Subsequently, as shown in FIG. 4B, a plurality of rotary bodies 120 are disposed in the plurality of cell spaces h of the substrate 110, respectively.

The rotary bodies 120 may be injected into the respective cell spaces h by using a squeegee or the like. In greater detail, a mask or a filter exposing only the cell spaces h is disposed on the substrate 110, and the rotary bodies 120 may be injected into the cell spaces h by using a squeegee.

Two or more types of rotary bodies are disposed in the plurality of cell spaces, and the same type of rotary bodies, which display the same color, include a plurality of rotary bodies having different respective shades. As shown, the same type of rotary bodies, which display the same color, include three rotary bodies 121a, 121b and 121c having different shades, and are disposed in adjacent cell spaces. The groups of these three rotary bodies are repetitively formed.

The rotary bodies 120 are disposed in the cell spaces h formed by the partition walls 111, and there is little possibility that the rotary bodies 120 are placed in locations, such as the partition walls, other than the cell spaces h.

Thereafter, as shown in FIG. 4C, the display side electrode 130 is formed on the substrate 110 to cover the rotary bodies 120. The display side electrode 130 may be formed of a transparent material.

The rear electrode 140 is formed on the substrate 110 so as to oppose the display side electrode 130.

Further, a thin film transistor (TFT) 150 may be formed on the rear electrode 140. Here, the thin film transistor 150 enables the independent driving of the rotary bodies 121a, 121b and 121c disposed in the cell spaces, respectively.

As set forth above, according to exemplary embodiments of the invention, the electronic paper display device includes two or more types of rotary bodies that display different respective colors, wherein the same type of rotary bodies, which display the same color, among those rotary bodies include a plurality of rotary bodies having different respective shades. Accordingly, a variety of shades can be expressed.

In addition, the rotary bodies are disposed in the cell spaces formed by the partition walls, and there is little possibility that the rotary bodies are placed in locations, such as the partition walls, other than the cell spaces. This prevents spots or blurs from occurring on a screen, thereby achieving high image stability and uniformity.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic paper display device comprising:
a display side electrode formed of a transparent material;
a rear electrode opposing the display side electrode;

a substrate disposed between the display side electrode and the rear electrode, and including a plurality of partition walls separating a space between the display side electrode and the rear electrode, and a plurality of cell spaces formed by the plurality of partition walls; and two or more types of rotary bodies disposed in the plurality of cell spaces and displaying different respective colors, wherein the rotary bodies each have a first display region colored white or black and a second display region colored red, green or blue, and the same type of rotary bodies, which display a common color, among the two or more types of rotary bodies, include commonly colored second display regions having different respective shades.

2. The electronic paper display device of claim 1, wherein the rotary bodies include three types of rotary bodies respectively displaying red, green and blue.

3. The electronic paper display device of claim 1, wherein the first and second display regions having different electrical charge properties.

4. The electronic paper display device of claim 1, wherein the same type of rotary bodies include three rotary bodies having a relative shade ratio of 4:2:1.

5. The electronic paper display device of claim 1, wherein the rotary bodies each have a spherical, oval or cylindrical shape.

6. A method of manufacturing an electronic paper display device, the method comprising:

preparing a substrate including a plurality of partition walls and a plurality of cell spaces formed by the plurality of partition walls;

disposing two or more types of rotary bodies displaying different respective colors in the plurality of cell spaces, wherein the rotary bodies each have a first display region colored white or black and a second display region colored red, green or blue, and the same type of rotary bodies, which display a common color, among the two or more types of rotary bodies, include commonly colored second display regions having different respective shades;

forming a display side electrode on the substrate to cover the rotary bodies; and forming a rear electrode on the substrate such that the rear electrode opposes the display side electrode.

7. The method of claim 6, wherein the substrate is formed by an imprinting process, a laser patterning process, a photolithography process or an etching process.

8. The method of claim 6, wherein the disposing of the two or more types of rotary bodies includes:

disposing a mask or a filter, exposing the cell spaces, on the substrate; and injecting the rotary bodies by using a squeegee.

* * * * *